(12) United States Patent
Zhang et al.

(10) Patent No.: US 12,205,516 B2
(45) Date of Patent: Jan. 21, 2025

(54) LED DRIVER CIRCUIT, DISPLAY DEVICE, AND DISPLAY SYSTEM

(71) Applicant: Chipone Technology (Beijing) Co., LTD., Beijing (CN)

(72) Inventors: Hanru Zhang, Beijing (CN); Zhizheng Huang, Beijing (CN); Jingshuai Wang, Beijing (CN)

(73) Assignee: Chipone Technology (Beijing) Co., Ltd. (CN)

( * ) Notice: Subject to any disclaimer, the term of this patent is extended or adjusted under 35 U.S.C. 154(b) by 0 days.

(21) Appl. No.: 17/883,315

(22) Filed: Aug. 8, 2022

(65) Prior Publication Data

US 2022/0375396 A1 Nov. 24, 2022

Related U.S. Application Data

(63) Continuation of application No. PCT/CN2021/116912, filed on Sep. 7, 2021.

(30) Foreign Application Priority Data

Aug. 17, 2020 (CN) .......................... 202010828121.0

(51) Int. Cl.
 *G09G 3/20* (2006.01)
 *G09G 3/32* (2016.01)
(52) U.S. Cl.
 CPC ............. *G09G 3/2096* (2013.01); *G09G 3/32* (2013.01); *G09G 2300/0857* (2013.01);
(Continued)

(58) Field of Classification Search
 CPC ................. G09G 3/2096; G09G 3/32; G09G 2300/0857; G09G 2310/0286; G09G 2310/0291; G09G 2330/021
 See application file for complete search history.

(56) References Cited

U.S. PATENT DOCUMENTS 9,013,386 B2 4/2015 Tsai et al.
2010/0134474 A1\* 6/2010 Watanabe ............. G11C 19/28
 345/213

(Continued)

FOREIGN PATENT DOCUMENTS

CN 106251806 12/2016
CN 107633794 1/2018

(Continued)

OTHER PUBLICATIONS

English translation of CN 111369937A "Dynamic energy-saving chip of LED display screen and connecting structure" published Jul. 3, 2020.\*

(Continued)

*Primary Examiner* — Benjamin C Lee
*Assistant Examiner* — Nathan P Brittingham
(74) *Attorney, Agent, or Firm* — Fish & Richardson P.C.

(57) ABSTRACT

The present application relates to light-emitting diode (LED) driver circuits, display devices, and display systems. An example LED driver circuit includes: a driver including a plurality of data channels; a controller electrically connected to the driver. The controller is configured to, in response to detecting that data in all the data channels is 0 in a predetermined time period, control all the data channels to be in a closed state. The predetermined time period is determined based on a duration of an external input signal input to the LED driver circuit.

20 Claims, 2 Drawing Sheets

(52) U.S. Cl.
CPC ............... *G09G 2310/0286* (2013.01); *G09G 2310/0291* (2013.01); *G09G 2330/021* (2013.01)

(56) References Cited

U.S. PATENT DOCUMENTS

| | | | | |
|---|---|---|---|---|
| 2016/0104428 | A1* | 4/2016 | In | G09G 3/3275 345/214 |
| 2018/0090048 | A1* | 3/2018 | Tang | G09G 3/2018 |
| 2018/0233075 | A1 | 8/2018 | Boyd | |

FOREIGN PATENT DOCUMENTS

| | | |
|---|---|---|
| CN | 109712556 | 5/2019 |
| CN | 109920369 | 6/2019 |
| CN | 110728938 | 1/2020 |
| CN | 111369937 | 7/2020 |
| CN | 111836427 | 10/2020 |
| CN | 212342250 | 1/2021 |
| TW | 202046285 | 12/2020 |

OTHER PUBLICATIONS

PCT International Search Report in International Appln. No. PCT/CN2021/116912, dated Nov. 23, 2021, 8 pages (With English Translation).

Office Action in Chinese Appln. No. 202010828121.0, mailed on Jun. 14, 2024, 15 pages (with English translation).

* cited by examiner

LED DRIVER CIRCUIT, DISPLAY DEVICE, AND DISPLAY SYSTEM

This present application is a continuation of and claims priority under 35 U.S.C. § 120 to PCT Application. No. PCT/CN2021/116912, filed on Sep. 7, 2021, which claims priority to Chinese Patent Application No. 202010828121.0, filed on Aug. 17, 2020, and entitled "LED DRIVING CIRCUIT, DISPLAY DEVICE, AND DISPLAY SYSTEM." All the above referenced priority documents are incorporated herein by reference in their entireties.

TECHNICAL FIELD

The present application relates to the field of light-emitting diode (LED) display, and in particular to an LED driver circuit, a display device, and a display system.

BACKGROUND

Currently LED driver chips are provided with Static Random-Access Memories (SRAMs) inside that can store two frames of data, in which one frame is the currently displayed data and the other frame is the data needed to be displayed in the next frame, and the chips achieve frame change by receiving frame synchronization signals. The existing dynamic energy saving method is to decide whether to perform dynamic energy saving by detecting if the data displayed in the next frame is all 0 (the displayed data being 0 indicates the corresponding LED is in an off state, i.e., the corresponding LED is in a black screen state), and to enter the dynamic energy saving state (i.e., the data channel corresponding to the LED in the black screen state is closed) if the data displayed in the next frame is detected all 0, so as to achieve black screen energy saving.

However, some existing LED constant-current driver chips are provided with no SRAM inside, and the system end does not transmit frame synchronization signals. Therefore, how to achieve dynamic energy saving in such LED constant-current driver chips becomes a problem that needs to be addressed.

SUMMARY

The main object of the present application is to provide an LED driver circuit, a display device, and a display system, so as to solve the problem in the prior art that dynamic energy saving cannot be realized in an LED constant-current driver chip without SRAM inside.

In order to achieve the above object, according to an aspect of the present application, there is provided an LED driver circuit comprising: a driver comprising a plurality of data channels; and a controller electrically connected to the driver, and configure to control, in response to detecting that data in all data channels is 0 within a predetermined time period, all the data channels to be in a closed state, the predetermined time period being determined based on a duration of an external input signal input to the LED driver circuit.

Alternatively, the controller comprises: a detection module electrically connected to the driver, and configured to detect whether the data in all the data channels is 0; a counter module electrically connected to the detection module; and a signal generating module electrically connected to the detection module and the counter module respectively, and having an output end that outputs a state signal for controlling all the data channels to be in the closed state in response to the data in all the data channels being 0.

Alternatively, the signal generating module has a first input end and a second input end, the counter module has a first input end and an output end, an output end of the detection module is electrically connected to the first input end of the signal generating module and the first input end of the counter module respectively, and the output end of the counter module is electrically connected to the second input end of the signal generating module.

Alternatively, the driver further comprises a reference current generating module and a current output module, the reference current generating module is electrically connected to the signal generating module and the current output module respectively, and the state signal controls the reference current generating module to be in an off state in response to the data in all the data channels being 0.

Alternatively, the driver further comprises: a shift register having a first input end for inputting serial data, a second input end for inputting an external clock signal, and an output end; a first inverter having an input end for inputting a latch enable signal; a second inverter having an input end for inputting a channel enable signal; and a data latch having a first input end, a second input end, a third input end, and an output end, data output at the output end of the data latch being the data in at least some of the data channels, the output end of the data latch being electrically connected to an input end of the detection module and an input end of the current output module respectively, the first input end of the data latch being electrically connected to an output end of the first inverter, the second input end of the data latch being electrically connected to the output end of the shift register, and the third input end of the data latch being electrically connected to an output end of the second inverter.

Alternatively, the driver further comprises a third inverter, the counter module further has a second input end, an input end of the third inverter is electrically connected to the output end of the first inverter, and an output end of the third inverter is electrically connected to the second input end of the counter module.

Alternatively, the current output module has a first input end, a second input end, and an output end, the first input end of the current output module is electrically connected to the output end of the data latch, the second input end of the current output module is electrically connected to the output end of the second inverter, and the output end of the current output module outputs a multi-channel constant-current signal.

Alternatively, the driver further comprises: a first in-phase buffer having an input end for inputting the serial data and an output end electrically connected to the first input end of the shift register; and a second in-phase buffer having an input end for inputting the external clock signal and an output end electrically connected to the second input end of the shift register.

Alternatively, the detection module includes a NOR gate.

According to another aspect of the present application, there is provided a display device comprising an LED driver circuit and an LED display screen, the LED driver circuit being any of the LED driver circuits described herein.

According to yet another aspect of the present application, there is provided a display system comprising an LED driver circuit, the LED driver circuit being any of the LED driver circuits described herein.

Through applying the technical solution of the present application, by providing a control unit in an LED driver circuit, the control unit, in response to detecting that data in all data channels is 0 within a predetermined time period (i.e., the driven LED is in a black screen state), controls all the data channels to be in a closed state, so as to reduce power consumption of the driving unit to achieve dynamic energy saving; the above driving unit is equivalent to an LED constant-current driver chip without SRAM inside, that is, the LED driver circuit of the present solution achieves dynamic energy saving in the LED constant-current driver chip without SRAM inside, and an external input signal is a signal outside the LED driver circuit which occupies neither resources of the LED driver circuit itself nor resources of the driving unit itself.

BRIEF DESCRIPTION OF THE DRAWINGS

The accompanying drawings, which constitute a part of the present application, serve to provide a further understanding of the present application, and illustrative embodiments of the present application and descriptions thereof serve to explain the present application and are not intended to unduly define the present application. In the drawings.

Figure 1:
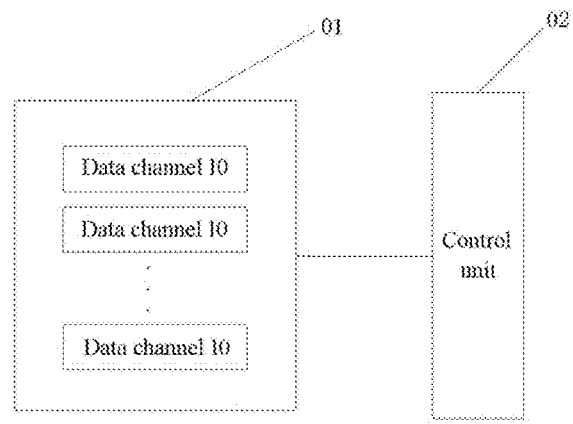
FIG. 1 shows a schematic diagram of an LED driver circuit according to an embodiment of the present application.

Wherein the above figures include the following reference numerals:

01. Driving unit; 10. Data channel; 11. Reference current generating module; 12. Current output module; 13. Shift register; 14. First inverter; 15. Second inverter; 16. Data latch; 17. Third inverter; 18. First in-phase buffer; 19. Second in-phase buffer; 02. Control unit; 20. Detection module; 21. Counter module; 210. First D flip-flop; 22. Signal generating module; 220. Third in-phase buffer; 221. Second D flip-flop.

DETAILED DESCRIPTION

It should be pointed out that the following detailed description is exemplary and is intended to provide a further description of the present application. Unless specified otherwise, all technical and scientific terms used herein have the same meaning as commonly understood by one of ordinary skills in the art to which the present application belongs.

It is to be noted that the terms used herein are for the purpose of describing particular embodiments only and is not intended to be limiting of exemplary embodiments according to the present application. As used herein, the singular forms are intended to include the plural forms as well, unless the context clearly indicates otherwise. Furthermore, it is also to be understood that the terms "comprises" and/or "comprising", when used in this description, specify the presence of features, steps, operations, devices, components, and/or combinations thereof.

It will be understood that when an element such as a layer, film, region, or substrate is described as being "on" another element, the element can be directly on the other element or intervening elements may also be present. Also, in the specification and claims, when it is described that an element is "connected" to another element, the element may be "directly connected" to the other element, or "connected" to the other element through a third element.

As described in the background, dynamic energy saving cannot be realized in an LED constant-current driver chip without SRAM inside in the prior art, and in order to solve the above technical problem, embodiments of the present application propose an LED driver circuit, a display device, and a display system.

According to an embodiment of the present application, an LED driver circuit is provided.

FIG. 1 is a schematic diagram of an LED driver circuit according to an embodiment of the present disclosure. As shown in FIG. 1, the LED driver circuit comprises:

a driving unit 01 including a plurality of data channels 10, data in the data channels being used to drive LEDs;

a control unit 02 electrically connected to the driving unit 01, and configured to control all the data channels 10 to be in a closed state in response to the control unit 02 detecting that the data in all the data channels 10 are 0 within a predetermined time period, the predetermined time period being obtained by counting an external input signal, the predetermined time period being determined based on a duration of the external input signal input to the LED driver circuit.

In the above solution, by providing a control unit in an LED driver circuit, the control unit, in response to detecting that data in all data channels is 0 within a predetermined time period (i.e., the driven LED is in a black screen state), controls all the data channels to be in a closed state, so as to reduce power consumption of the driving unit to achieve dynamic energy saving; the above driving unit is equivalent to an LED constant-current driver chip without SRAM inside, that is, the LED driver circuit of the present solution achieves dynamic energy saving in the LED constant-current driver chip without SRAM inside, and the external input signal is a signal outside the LED driver circuit which occupies neither resources of the LED driver circuit itself nor resources of the driving unit itself.

Specifically, the external input signal is a signal outside the LED driver circuit. The external input signal is neither on the LED driver circuit nor on the driving unit, that is, the external input signal is not on the LED constant-current driver chip without SRAM inside, thus does not occupy resources of the chip itself, and save resources of the chip.

Alternatively, the predetermined time period is determined according to the duration of the external input signal input into the LED driver circuit, specifically, the predetermined time period may be obtained by counting rising edges, falling edges, high levels, and low levels of the external input signal.

Specifically, the predetermined time period includes, but is not limited to, 5 s, 10 s, 15 s, which may be adjusted according to actual circumstances.

Specifically, the external input signal may be a latch enable signal, an external input clock signal, and a channel enable signal, etc.

It is to be noted that the LED constant-current driver chip with no SRAM inside herein refers to a chip with no SRAM inside, and therefore a control unit needs to be added to achieve dynamic energy saving.

Specifically, the number of data channels is one of 8, 16, 32, 64, and of course, the number of data channels can be set depending on the actual circumstances. For example, 64 LEDs are included in an LED display screen, the 64 LEDs may be divided equally into 8 parts, each of which has 8 LEDs, and 8 driving units are provided, each of which includes 8 data channels, and the data in each of the data channels drives an LED. Thereby driving of the whole LED display screen is realized.

Figure 2:
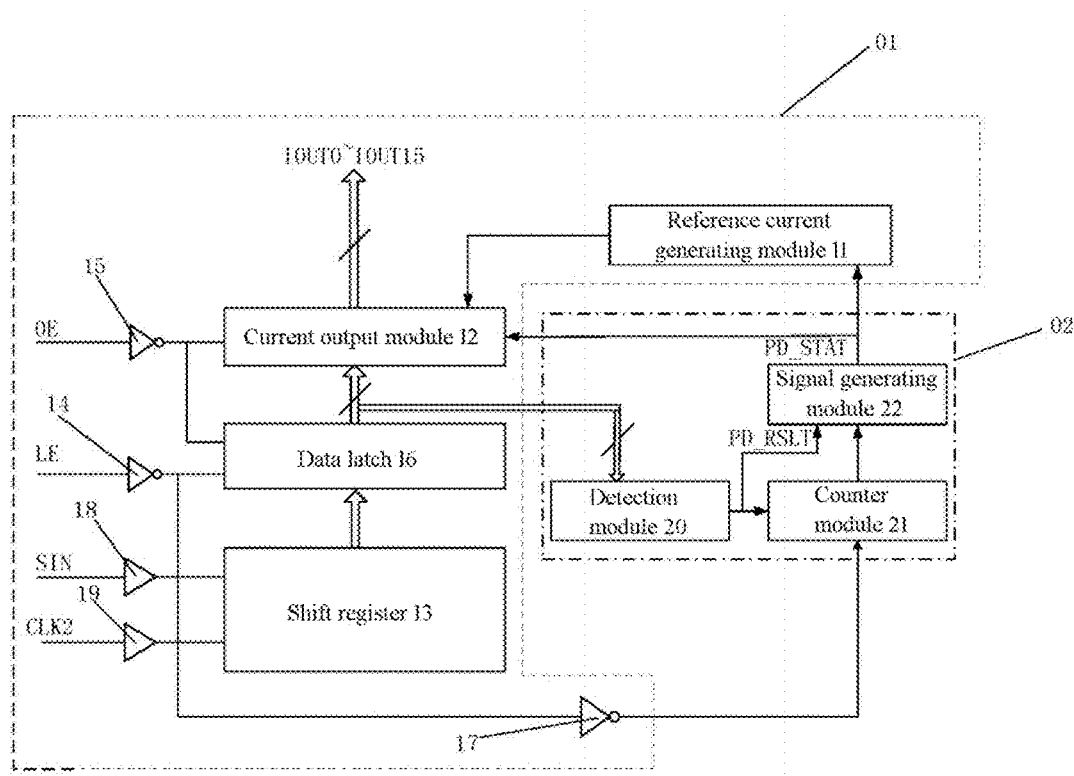
FIG. 2 shows a schematic diagram of another LED driver circuit according to an embodiment of the present application.

In an embodiment of the present application, as shown in FIG. 2, the control unit 02 comprises a detection module 20, a counter module 21, and a signal generating module 22. The detection module 20 is electrically connected to the driving unit 01, and is configured to detect whether data in all data channels 10 is 0; the counter module 21 is electrically connected to the detection module 20; and the signal generating module 22 is electrically connected to the detection module 20 and the counter module 21 respectively, and has an output end that outputs a state signal PD_STAT for controlling all the data channels 10 to be in the closed state in response to the data in all the data channels 10 being 0. In response to the detection module 20 detecting that the data in all the data channels 10 is 0, the counter module 21 starts timing, and in the case where the data in all the data channels 10 remains 0 within a predetermined time period timed by the counter module 21, that is, the data in the data channels 10 is in an idle state within the predetermined time period, in order to save energy, at this time, the signal generating module 22 outputs a state signal PD_STAT for controlling all the data channels 10 to be in the closed state for energy saving.

In another embodiment of the present application, as shown in FIG. 2, the signal generating module 22 has a first input end and a second input end, the counter module 21 has a first input end and an output end, an output end of the detection module 20 is electrically connected to the first input end of the signal generating module 22 and the first input end of the counter module 21 respectively, and the output end of the counter module 21 is electrically connected to the second input end of the signal generating module 22. An output signal at the output end of the detection module 20 is PD_RSLT. In the case where the detection module 20 detects that the data in all the data channels 10 is 0, the counter module 21 starts timing, and in the case where the data in all the data channels 10 remains 0 within a predetermined time period timed by the counter module 21, that is, the data in the data channels 10 is in an idle state within the predetermined time period, in order to save energy, at this time, the signal generating module 22 outputs a state signal PD_STAT for controlling all the data channels 10 to be in the closed state for energy saving.

In yet another embodiment of the present application, as shown in FIG. 2, the driving unit 01 further comprises a reference current generating module 11 and a current output module 12. The reference current generating module 11 is electrically connected to the signal generating module 22 and the current output module 12 respectively. In response to the data in all the data channels 10 being 0, the state signal PD_STAT controls the reference current generating module 11 to be in an off-state. In the case where the detection module 20 detects that the data in all the data channels 10 is 0, the counter module 21 starts timing, and in the case where the data in all the data channels 10 remains 0 within a predetermined time period timed by the counter module 21, that is, the data in the data channels 10 in in an idle state within the predetermined time period, in order to save energy, at this time, the signal generating module 22 outputs a state signal PD_STAT for controlling the reference current generating module 11 to be in an off state, i.e. controlling the reference current generating module 11 not to generate a reference current, that is, controlling the current output module 12 not to generate constant-current outputs IOUT0 to IOUT15, so as to achieve dynamic energy saving.

Figure 3:
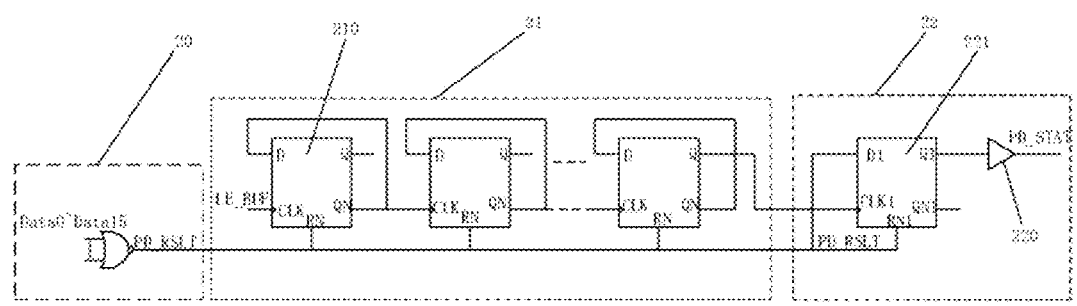
FIG. 3 shows a schematic diagram of a control unit according to an embodiment of the present application.

In an embodiment of the present disclosure, as shown in FIGS. 2 and 3, the driving unit 01 further comprises a shift register 13, a first inverter 14, a second inverter 15, and a data latch 16. The shift register 13 has a first input end for inputting serial data SIN, a second input end for inputting an external clock signal CLK2, and an output end; the first inverter 14 has an input end for inputting a latch enable signal LE; the second inverter 15 has an input end for inputting a channel enable signal OE; and the data latch 16 has a first input end, a second input end, a third input end, and an output end. The data output at the output end of the data latch 16 is data in a plurality of the data channels 10. The output end of the data latch 16 is electrically connected to an input end of the detection module 20 and an input end of the current output module 12 respectively, the first input end of the data latch 16 is electrically connected to an output end of the first inverter 14, the second input end of the data latch 16 is electrically connected to the output end of the shift register 13, and the third input end of the data latch 16 is electrically connected to an output end of the second inverter 15. The serial data SIN input from the first input end of the shift register 13, after being subjected to the shift register 13 under the action of the input external clock signal CLK2, is input to the data latch 16, and the data latch 16 latches the data output by the shift register 13 and then outputs it. The data output by the output end of the data latch 16 is data in a plurality of the data channels 10. In the case where the detection module 20 detects that the data in all the data channels 10 is 0, that is, Data0 to Data15 in FIG. 3 are all 0, the counter module 21 starts timing. In the case where the data in all the data channels 10 remains 0 within a predetermined time period timed by the counter module 21, that is, the data in the data channels 10 is in an idle state within the predetermined time period, in order to save energy, at this time, the signal generating module 22 outputs a state signal PD_STAT for controlling the reference current generating module 11 and the current output module 12 to be in an off state, that is, controlling the current output module 12 not to generate a constant-current output, so as to achieve dynamic energy saving.

In a more specific embodiment, as shown in FIG. 2, the driving unit 01 further comprises a third inverter 17, the counter module 21 further has a second input end, an input end of the third inverter 17 is electrically connected to the output end of the first inverter 14, and an output end of the third inverter 17 is electrically connected to the second input end of the counter module 21. The latch enable signal LE input at the input end of the first inverter 14, after being inverted twice by the first inverter 14 and the third inverter 17, outputs a LE_BUF signal, which is the clock signal of the counter module 21.

In a specific embodiment, the second input end of the counter module is electrically connected to an output end of the second inverter, that is, the channel enable signal is used as the clock signal of the counter module.

In a specific embodiment, the second input end of the counter module is electrically connected to an output end of a second in-phase buffer, that is, the external clock signal is used as the clock signal of the counter module.

In an embodiment of the present application, as shown in FIG. 3, the detection module 20 comprises a NOR gate, and the NOR gate in FIG. 3 is a 16-input and 1-output NOR gate. Of course, the detection module 20 may also be another type of logic gate circuit, and may be one logic gate circuit or a combination of a plurality of logic gate circuits, as long as the output is 1 when all the input signals are 0 (the output being 1 indicates the counter module 21 starting timing).

In an embodiment of the present disclosure, as shown in FIG. 3, the signal generating module 22 comprises a third in-phase buffer 220. An output end Q1 of the signal generating module 22 is connected to an input end of the third in-phase buffer 220, and an output end of the third in-phase buffer 220 outputs a state signal PD_STAT.

In a specific embodiment of the present application, as shown in FIGS. 2 and 3, the counter module 21 is composed of a plurality of first D flip-flops 210 in cascade. The first D flip-flop 210 has a clock signal input end CLK, a data end D, a first output end Q, a second output end QN, and a reset end RN. The second output end QN of each of the first D flip-flops 210 is connected to its data end D, the signal input at the signal input end CLK is LE_BUF, the signal input end CLK is the second input end of the counter module 21 in FIG. 2, and the second output end QN of the first one of the adjacent two first D flip-flops 210 is connected to the clock signal input end CLK of the second one thereof. The signal generating module 22 comprises a second D flip-flop 221 having a clock signal input CLK1, a data end D1, a first output end Q1, a second output end QN1, and a reset end RN1. The clock signal input CLK1 of the second D flip-flop 221 is connected to the first output end Q of the first D flip-flop 210. The output signal at the output end of the detection module 20 is PD_RSLT, and the output end of the detection module 20 is connected to the reset end RN of the first D flip-flop, the reset end RN1 of the second D flip-flop 221, and the data end D1 of the signal generating module 22 respectively. In the case where the data in at least one of the 16 data channels 10 (i.e., Data0 to Data15) is not 0, the output signal PD_RSLT at the output end of the detection module 20 is 0, that is, the input signal at the reset end RN is 0, the output at the first output end Q of the first D flip-flop 210 is 0 and the output at the second output end QN is 1. Similarly, the input signal at the reset end RN1 is 0, at this time, the output at the first output end Q1 of the second D flip-flop 221 is 0, the output at the second output end QN1 is 1, that is, as long as any data in the 16 data channels 10 is not 0, the output at the first output end Q of the first D flip-flop 210 is 0 and the output at the first output end Q1 of the second D flip-flop 221 is 0, that is, the state signal PD_STAT output by the signal generating module 22 is 0, at this time, the state signal PD_STAT does not work, that is, the reference current generating module 11 and the current output module 12 are in a normal operating state. In the case where the data in the 16 data channels 10 from Data0 to Data15 are all 0, the output signal PD_RSLT at the output end of the detection module 20 is 1, that is, the input signal at the reset end RN is 1, at this time, the counter module 21 starts timing, and in the case where the data in all the data channels 10 remains 0 within a predetermined time period timed by the counter module 21, under the co-action of the counter module 21 and the detection module 20, the state signal PD_STAT is not 0. At this time, the state signal PD_STAT controls the reference current generating module 11 and the current output module 12 to be in an off state, that is, controls the current output module 12 not to generate a constant-current output, so as to achieve dynamic energy saving.

In a more specific implementation, as shown in FIG. 3, when the detection module 20 detects that the data in the 16 data channels 10 from Data0 to Data15 are all 0, the detection module 20 is triggered to start timing. The LE_BUF is the clock input signal of the detection module 20, i.e. the input signal of the second input end of the counter module 21. The output end Q of the counter module 21 is connected to the second input end CLK1 of the signal generating module 22, and the output end of the detection module 20 is connected to the first input end RN of the counter module 21.

In another embodiment of the present application, as shown in FIG. 2, the current output module 12 has a first input end electrically connected to the output end of the data latch 16, a second input end electrically connected to the output end of the second inverter 15, and an output end that outputs a multi-channel constant-current signal. The multi-channel constant-current signal output by the current output module 12 is used to drive an external LED, and when the current output module 12 is in an off state, the external LED is not driven, so as to achieve energy saving.

In an alternative embodiment, as shown in FIG. 2, the driving unit 01 further comprises a first in-phase buffer 18 and a second in-phase buffer 19. An input end of the first in-phase buffer 18 is used to input the serial data SIN, an output end of the first in-phase buffer 18 is electrically connected to the first input end of the shift register 13, and an input end of the second in-phase buffer 19 is used to input the external clock signal CLK2, an output end of the second in-phase buffer 19 is electrically connected to the second input end of the shift register 13. The first in-phase buffer 18 acts to buffer the incoming serial data SIN, and the second in-phase buffer 19 acts to buffer the incoming external clock signal CLK2.

In a preferred embodiment, as shown in FIG. 2, the channel enable signal OE, the latch enable signal LE, the serial data SIN, and the external clock signal CLK2 described above are all externally input signals, which do not occupy the resources of the driving unit 01 itself.

In an exemplary embodiment of the present application, a display device is provided, comprising an LED driver circuit and an LED display screen, the LED driver circuit being any of the LED driver circuits described above. By providing a control unit in the LED driver circuit, the control unit, in response to detecting that data in all data channels is 0 within a predetermined time period (i.e., the driven LED is in a black screen state), controls all the data channels to be in a closed state, so as to control part of the LEDs in the LED display screen to be non-display (i.e. to be in a black screen state), thereby realizing dynamic energy saving in the LED display screen; the driving unit is equivalent to an LED constant-current driver chip without SRAM inside, that is, the LED driver circuit of the present solution achieves dynamic energy saving in the LED constant-current driver chip without SRAM inside.

In another exemplary embodiment of the present application, a display system is provided, comprising an LED driver circuit, the LED driver circuit being any of the LED driver circuits described above. By providing a control unit in the LED driver circuit, the control unit, in response to detecting that data in all data channels is 0 within a predetermined time period (i.e., the driven LED is in a black screen state), controls all the data channels to be in a closed state, so as to reduce power consumption of the driving unit to achieve dynamic energy saving; the above driving unit is equivalent to an LED constant-current driver chip without SRAM inside, that is, the LED driver circuit of the present solution achieves dynamic energy saving in the LED constant-current driver chip without SRAM inside, and an external input signal is a signal outside the LED driver circuit which occupies neither resources of the LED driver circuit itself nor resources of the driving unit itself.

From the above description, it can be seen that the above embodiments of the present application achieve the following technical effects:

1). As for the LED driver circuit of the present application, by providing a control unit in the LED driver circuit, the control unit, in response to detecting that data in all data channels is 0 within a predetermined time period (i.e., the driven LED is in a black screen state), controls all the data channels to be in a closed state, so as to reduce power consumption of the driving unit to achieve dynamic energy saving; the above driving unit is equivalent to an LED constant-current driver chip without SRAM inside, that is, the LED driver circuit of the present solution achieves dynamic energy saving in the LED constant-current driver chip without SRAM inside, and an external input signal is a signal outside the LED driver circuit which occupies neither resources of the LED driver circuit itself nor resources of the driving unit itself.

2). As for the display device of the present application, by providing a control unit in the LED driver circuit, the control unit, in response to detecting that data in all data channels is 0 within a predetermined time period (i.e., the driven LED is in a black screen state), controls all the data channels to be in a closed state, so as to control part of the LEDs in the LED display screen to be non-display (i.e. to be in a black screen state), thereby achieving dynamic energy saving; the above driving unit is equivalent to an LED constant-current driver chip without SRAM inside, that is, the LED driver circuit of the present solution achieves dynamic energy saving in the LED constant-current driver chip without SRAM inside, and an external input signal is a signal outside the LED driver circuit which occupies neither resources of the LED driver circuit itself nor resources of the driving unit itself.

3). As for the display system of the present application, by providing a control unit in the LED driver circuit, the control unit, in response to detecting that data in all data channels is 0 within a predetermined time period (i.e., the driven LED is in a black screen state), controls all the data channels to be in a closed state, so as to reduce power consumption of the driving unit to achieve dynamic energy saving; the above driving unit is equivalent to an LED constant-current driver chip without SRAM inside, that is, the LED driver circuit of the present solution achieves dynamic energy saving in the LED constant-current driver chip without SRAM inside, and an external input signal is a signal outside the LED driver circuit which occupies neither resources of the LED driver circuit itself nor resources of the driving unit itself.

The foregoing descriptions are merely preferred embodiments of the present application and are not intended to limit the present application. For those skilled in the art, various alterations and changes could be made to the present application. Any modifications, equivalents, improvements, etc. made thereto within the spirit and principle of the disclosure shall be encompassed within the scope of protection of the application.

What is claimed is:

1. A light-emitting diode (LED) driver circuit comprising:
a driver comprising a plurality of data channels, a shift register having an output end, a data latch having a first input end and an output end, the first input end of the data latch being electronically connected to the output end of the shift register; and
a controller comprising a detector having an input end, the input end of the detector being electronically connected to the output end of the data latch, the output end of the data latch configured to output data in the plurality of data channels, and the detector configured to receive data in all of the plurality of data channels and detect whether the data in all of the plurality of data channels is 0,
wherein the controller is configured to control, in response to detecting that the data in all of the plurality of data channels is 0 within a predetermined time period, all of the plurality of data channels to be in a closed state, the predetermined time period being determined based on a duration of an external input signal input to the LED driver circuit, and
wherein the controller comprises:
a counter electrically connected to the detector; and
a signal generator electrically connected to the detector and the counter respectively, and having an output end that outputs a state signal for controlling all the data channels to be in the closed state in response to the data in all the data channels being 0,
wherein the signal generator has a first input end and a second input end, the counter has a first input end and an output end, an output end of the detector is electrically connected to the first input end of the signal generator and the first input end of the counter respectively, and the output end of the counter is electrically connected to the second input end of the signal generator.

2. The LED driver circuit according to claim 1, wherein the driver further comprises a reference current generator and a current output component, the reference current generator is electrically connected to the signal generator and the current output component respectively, and the state signal controls the reference current generator to be in an off state in response to the data in all the data channels being 0.

3. The LED driver circuit according to claim 2, wherein the driver further comprises:
a first inverter having an input end for inputting a latch enable signal for the data latch; and
a second inverter having an input end for inputting a channel enable signal,
wherein the shift register further having a first input end for inputting serial data and a second input end for inputting an external clock signal, and
wherein the data latch further has a second input end and a third input end, the output end of the data latch is electrically connected to an input end of the current output component, the second input end of the data latch is electrically connected to an output end of the first inverter, and the third input end of the data latch is electrically connected to an output end of the second inverter.

4. The LED driver circuit according to claim 3, wherein:
the driver further comprises a third inverter, the counter further has a second input end for receiving a clock signal, an input end of the third inverter is electrically connected to the output end of the first inverter, and an output end of the third inverter is electrically connected to the second input end of the counter, wherein the clock signal for the counter is based on the latch enable signal for the data latch.

5. The LED driver circuit according to claim 3, wherein the current output component has a first input end, a second input end, and an output end, the first input end of the current output component is electrically connected to the output end of the data latch, the second input end of the current output component is electrically connected to the output end of the second inverter, and the output end of the current output component outputs a multi-channel constant-current signal.

6. The LED driver circuit according to claim 3, wherein the driver further comprises:
a first in-phase buffer having an input end for inputting the serial data and an output end electrically connected to the first input end of the shift register; and a second in-phase buffer having an input end for inputting the external clock signal and an output end electrically connected to the second input end of the shift register.

7. The LED driver circuit according to claim 1, wherein the detector comprises a NOR gate.

8. A display device comprising a light-emitting diode (LED) driver circuit, the LED driver circuit comprising:
a driver comprising a plurality of data channels, a shift register having an output end, a data latch having a first input end and an output end, the first input end of the data latch being electronically connected to the output end of the shift register; and
a controller comprising a detector having an input end, the input end of the detector being electronically connected to the output end of the data latch, the output end of the data latch configured to output data in the plurality of data channels, and the detector configured to receive data in all of the plurality of data channels and detect whether the data in all of the plurality of data channels is 0,
wherein the controller is configured to control, in response to detecting that the data in all of the plurality of data channels is 0 within a predetermined time period, all of the plurality of data channels to be in a closed state, the predetermined time period being determined based on a duration of an external input signal input to the LED driver circuit, and
wherein the controller comprises:
a counter electrically connected to the detector; and
a signal generator electrically connected to the detector and the counter respectively, and having an output end that outputs a state signal for controlling all the data channels to be in the closed state in response to the data in all the data channels being 0,
wherein the signal generator has a first input end and a second input end, the counter has a first input end and an output end, an output end of the detector is electrically connected to the first input end of the signal generator and the first input end of the counter respectively, and the output end of the counter is electrically connected to the second input end of the signal generator.

9. The display device according to claim 8, wherein the driver further comprises a reference current generator and a current output component, the reference current generator is electrically connected to the signal generator and the current output component respectively, and the state signal controls the reference current generator to be in an off state in response to the data in all the data channels being 0.

10. The display device according to claim 9, wherein the driver further comprises:
a first inverter having an input end for inputting a latch enable signal for the data latch; and
a second inverter having an input end for inputting a channel enable signal,
wherein the shift register further having a first input end for inputting serial data and a second input end for inputting an external clock signal, and
wherein the data latch further has a second input end, and a third input end, the output end of the data latch is electrically connected to an input end of the current output component, the second input end of the data latch is electrically connected to an output end of the first inverter, and the third input end of the data latch is electrically connected to an output end of the second inverter.

11. The display device according to claim 10, wherein the driver further comprises a third inverter, the counter further has a second input end for receiving a clock signal, an input end of the third inverter is electrically connected to the output end of the first inverter, and an output end of the third inverter is electrically connected to the second input end of the counter, wherein the clock signal for the counter is based on the latch enable signal for the data latch.

12. The display device according to claim 10, wherein the current output component has a first input end, a second input end, and an output end, the first input end of the current output component is electrically connected to the output end of the data latch, the second input end of the current output component is electrically connected to the output end of the second inverter, and the output end of the current output component outputs a multi-channel constant-current signal.

13. The display device according to claim 10, wherein the driver further comprises:
a first in-phase buffer having an input end for inputting the serial data and an output end electrically connected to the first input end of the shift register; and
a second in-phase buffer having an input end for inputting the external clock signal and an output end electrically connected to the second input end of the shift register.

14. The display device according to claim 8, wherein the detector comprises a NOR gate.

15. A display system comprising a light-emitting diode (LED) driver circuit and a display screen, the LED driver circuit comprising:
a driver comprising a plurality of data channels, a shift register having an output end, a data latch having a first input end and an output end, the first input end of the data latch being electronically connected to the output end of the shift register; and
a controller comprising a detector having an input end, the input end of the detector being electronically connected to the output end of the data latch, the output end of the data latch configured to output data in the plurality of data channels, and the detector configured to receive data in all of the plurality of data channels and detect whether the data in all of the plurality of data channels is 0,
wherein the controller is configured to control, in response to detecting that the data in all of the plurality of data channels is 0 within a predetermined time period, all of the plurality of data channels to be in a closed state, the predetermined time period being determined based on a duration of an external input signal input to the LED driver circuit, and
wherein the controller comprises:
a counter electrically connected to the detector; and
a signal generator electrically connected to the detector and the counter respectively, and having an output end that outputs a state signal for controlling all the data channels to be in the closed state in response to the data in all the data channels being 0,
wherein the signal generator has a first input end and a second input end, the counter has a first input end and an output end, an output end of the detector is electrically connected to the first input end of the signal generator and the first input end of the counter respectively, and the output end of the counter is electrically connected to the second input end of the signal generator.

16. The display system according to claim 15, wherein the driver further comprises a reference current generator and a current output component, the reference current generator is electrically connected to the signal generator and the current output component respectively, and the state signal controls the reference current generator to be in an off state in response to the data in all the data channels being 0.

17. The display system according to claim 16, wherein the driver further comprises:
- a first inverter having an input end for inputting a latch enable signal for the data latch; and
- a second inverter having an input end for inputting a channel enable signal,
- wherein the shift register further having a first input end for inputting serial data and a second input end for inputting an external clock signal, and
- wherein the data latch further has a second input end, and a third input end, the output end of the data latch is electrically connected to an input end of the current output component, the second input end of the data latch is electrically connected to an output end of the first inverter, and the third input end of the data latch is electrically connected to an output end of the second inverter.

18. The display system according to claim 17, wherein the driver further comprises a third inverter, the counter further has a second input end for receiving a clock signal, an input end of the third inverter is electrically connected to the output end of the first inverter, and an output end of the third inverter is electrically connected to the second input end of the counter, wherein the clock signal for the counter is based on the latch enable signal for the data latch.

19. The display system according to claim 17, wherein the current output component has a first input end, a second input end, and an output end, the first input end of the current output component is electrically connected to the output end of the data latch, the second input end of the current output component is electrically connected to the output end of the second inverter, and the output end of the current output component outputs a multi-channel constant-current signal.

20. The display system according to claim 15, wherein the detector comprises a NOR gate.

* * * * *